Patented Nov. 21, 1950

2,530,769

UNITED STATES PATENT OFFICE 2,530,769

DIPHENYL AMINE DERIVATIVES

Arthur L. Hollis, Akron, Ohio, assignor to The B. F. Goodrich Company, New York, N. Y., a corporation of New York No Drawing. Application January 12, 1950, Serial No. 138,270

2 Claims. (Cl. 252—401)

This invention relates to mixed derivatives of diphenyl amine and to a method of preparing the same, and more specifically pertains to a liquid composite product containing a p,p'-dioctyl diphenyl amine, a p'-mono-octyl diphenyl amine, a p-mono-octyl-p'-mono-phenethyl diphenyl amine, a p,p'-di-phenethyl diphenyl amine and a p-mono-phenethyl diphenyl amine, in which product there is present from 50 to 70% by weight of the p,p'-disubstituted diphenyl amines and from 30 to 50% by weight of the p-mono-substituted diphenyl amines.

I have discovered that a permanently-liquid oily composite product of unusual and advantageous properties is formed by cojointly reacting diisobutylene and styrene with diphenyl amine, in the presence of a Friedel-Craft condensation catalyst such as aluminum chloride, utilizing a weight ratio of diisobutylene to styrene in the hydrocarbon component of the reactants of from 2:1 to 5:1 preferably from 3:1 to 4:1 and a hydrocarbon to diphenyl amine mole ratio in the reactants of from 1.3:1 to 2:1, preferably from 1.3:1 to 1.5:1. This composite, oily product consists principally of the following compounds:

(1)
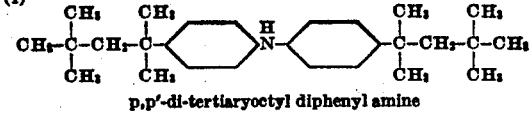
p,p'-di-tertiaryoctyl diphenyl amine (the radical $CH_3$—$\overset{CH_3}{\underset{CH_3}{C}}$—$CH_2$—$\overset{CH_3}{\underset{CH_3}{C}}$— being referred to herein as tertiaryoctyl)

(2)
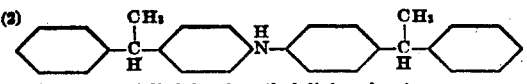
p,p'-di-alpha-phenethyl diphenyl amine (3)
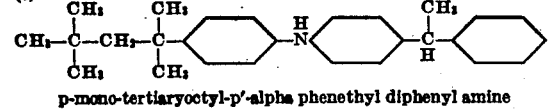
p-mono-tertiaryoctyl-p'-alpha phenethyl diphenyl amine (4)
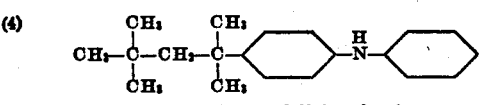
p-mono-tertiaryoctyl diphenyl amine (5)
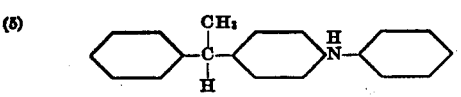
p-alpha-phenethyl diphenyl amine Compounds 1, 2 and 3 make up from 50% to 70% by weight of the product with Compound 1 being most abundant of these, while Compounds 4 and 5 make up the remaining 30% to 50%, with Compound 4 being more abundant than Compound 5.

The composite oily product of this invention is exceptionally useful as an antioxidant for the preservation of oxidizable organic substances such as rubber, both natural and synthetic, fatty oils, petroleum oils, soaps, etc. Since it is a liquid, it can be conveniently added to and easily mixed with the material it is to protect from oxidation.

The fact that the composite oily product remains an oily liquid even after long periods of storage under normal storage temperatures is quite surprising since one of its components, p,p'-di-tertiaryoctyl diphenyl amine, which is the most abundant disubstituted derivative, is a solid having a melting point of 103° C. and would be expected to crystallize out of the mixture. This compound does, in fact, immediately crystallize on cooling of the liquid mixture obtained by the reaction of diisobutylene alone with diphenyl amine with the result that such mixtures cannot be poured or pumped from storage to use as antioxidant. The reaction product of diphenyl amine with styrene alone is also so viscous and tarry as to be incapable of handling. When styrene is used along with diisobutylene, in accordance with this invention, however, the resulting mixture always remains a flowable easily-used liquid antioxidant.

The antioxidant properties of the composite product of this invention are excellent, which is also somewhat surprising. Despite the fact that it contains an appreciable proportion of aralkyl-substituted diphenyl amines, it imparts a resistance to deterioration to rubbery materials which is equal to or even better than that obtained with permanently liquid diphenyl amine derivatives containing only alkyl substituents such as the well known mixed mono- and di-heptylated diphenyl amines. It is also a non-staining antioxidant since it does not cause staining or darkening of light colored rubber compositions in which it is incorporated. In addition, rubber vulcanizates containing it are quite resistant to flexing.

In preparing the composite oily products of this invention, the blend of diisobutylene and styrene in the weight ratio hereinabove set forth is reacted with diphenyl amine using the mole ratio of hydrocarbons (diisobutylene and styrene) to diphenyl amine also hereinabove set forth, in the presence of about 0.05 to 0.2 mole (based on each mole of diphenyl amine) of a Friedel-Crafts condensation catalyst such as aluminum chloride or zinc chloride, and at a temperature in the range of about 150 to 200° C. After the reaction has taken place the oily product is separated from the reaction mixture in any desired manner, preferably by washing with alkali to remove the catalyst and distilling to remove unreacted hydrocarbons and diphenyl amine. The following examples illustrate the preparation in more detail.

Example I

To an iron autoclave there was added 50 pounds of aluminum chloride (anhydrous) and 750 pounds (4.43 lb. moles) of molten diphenyl amine. The autoclave was sealed and this mixture was heated to 150° C. A hydrocarbon mixture containing 182 pounds of styrene (1.75 lb. moles) and 555 pounds of diisobutylene (4.96 lb. moles) were then pumped into the autoclave. An exothermic reaction began immediately on addition of the hydrocarbon mixture and the reaction temperature rose to about 170° C. The reacting mixture was held at 165° C. to 185° C. for 90 minutes after the hydrocarbon mixture had been added. Then the resulting mixture was externally cooled to about 40° C. and dropped into a cold water wash tank under a slight hydrocarbon pressure. Two layers formed, an oil layer and a water layer. The water layer was removed and discarded. Then 125 pounds of aqueous sodium hydroxide solution containing 50% by weight of sodium hydroxide were added to the oil layer to facilitate complete removal of aluminum chloride. No emulsion formed and the resulting aqueous layer was removed without difficulty.

The oil which was now free from aluminum chloride was charged to a still pot where low boiling material was stripped off at a reduced pressure of about 3 mm. Hg and at a temperature up to 180° C. In this manner 177 pounds of low boiling material containing 50 pounds of diphenyl amine and 127 pounds of unreacted hydrocarbons were stripped off, and 1260 pounds of an oily liquid composite product were recovered. The oily liquid composite product was substantially composed of the five derivatives of diphenyl amine hereinabove enumerated and consisted of about 70% of the disubstituted diphenyl amine derivatives and about 30% of the monosubstituted diphenyl amine derivatives. This oily liquid composite product possessed a viscosity as determined with the Brookfield viscosimeter below 10,000 centipoises at 77° F., a boiling range of 180 to 300° C. at 3 mm. Hg and a specific gravity at 60° F. of 0.996.

Example II

To an iron autoclave there was added 50 pounds of aluminum chloride (anhydrous) and 1050 pounds (6.19 lb. moles) of molten diphenyl amine. The autoclave was sealed and this mixture was heated to 150° C. Then there was pumped into the autoclave a hydrocarbon blend containing 190 pounds (1.84 lb. moles) of styrene and 760 pounds (6.79 lb. moles) of diisobutylene. An exothermic reaction started as soon as the hydrocarbon mixture entered the autoclave causing the temperature of the reactants to rise to about 170° C. The reaction mixture was controlled between 165° C. and 185° C. for 90 minutes after all the hydrocarbons had been pumped into the autoclave. Then the resulting mixture was cooled to about 40° C. and dropped into a wash tank containing cold water and kept under a slight hydrocarbon pressure. Two layers formed, an oil layer and a water layer. The water layer was removed and discarded. Then 125 pounds of aqueous sodium hydroxide solution containing 50% by weight of sodium hydroxide were added to the oil layer in the wash tank to facilitate complete removal of aluminum chloride. No emulsion formed and the resulting aqueous layer was removed without difficulty.

The oily product now free from aluminum chloride was charged to a still pot where low boiling materials were stripped off at a reduced pressure of about 3 mm. Hg and at a temperature up to 180° C. In this manner, 219 pounds of low boiling material was stripped off consisting of 105 pounds of diphenyl amine and 114 pounds of hydrocarbons. The residue consisted of 1781 pounds, a yield of 89%, of an oily liquid composite product which had a viscosity of 9000 centipoises at 77° F. It was composed essentially of the same five diphenyl amine derivatives as in Example I in the ratio of 66% of disubstituted diphenyl amine derivatives and 33% of monosubstituted diphenyl amine derivatives.

The usefulness as a rubber antioxidant of the oily liquid composite product of this invention as compared to other liquid antioxidants is demonstrated in Examples III and IV. Example III relates to the use of antioxidants in natural rubber latex where it is important that the antioxidant be in liquid form to facilitate mixing with the latex. Example IV relates to the use of antioxidants in a butadiene copolymer synthetic rubber where it is also important that a liquid antioxidant be used since the antioxidant must be incorporated in the synthetic rubber in the process of its manufacture when the synthetic rubber is in the liquid latex state.

Example III

Two identical samples of natural rubber latex were compounded in the same manner by the addition thereto of a 10% solution of ammonium caseinate, a 10% solution of potassium hydroxide, an emulsion of a liquid antioxidant, a 40% sulfur dispersion, an accelerator known as Setsit #5 (a dithiocarbamate type latex accelerator supplied by R. T. Vanderbilt Co.) and a 50% dispersion of zinc oxide. The antioxidant emulsions used in the two latex samples each contained 94 parts of water, 4 parts of a dehydrogenated rosin acid soap known as Dresinate 731 (supplied by Hercules Powder Co.) and 2 parts of sodium pyrophosphate to 100 parts of liquid antioxidant, but the liquid antioxidants used in the two samples differed in nature, one being a liquid mixture of mono- and di-heptylated diphenyl amines and the other being the product of Example II hereinabove. The proportions of materials used were such that the latex compounds contained on a dry basis:

|  | Compound A | Compound B |
|---|---|---|
| Natural Rubber | 100 | 100 |
| Casein (Ammonium) | 0.5 | 0.5 |
| Potassium Hydroxide | 0.5 | 0.5 |
| Sulfur | 1.0 | 1.0 |
| Accelerator | 1.0 | 1.0 |
| Zinc Oxide | 2.0 | 2.0 |
| Mono- and di-heptylated diphenyl amines as antioxidant | 1.0 |  |
| Product of Example II as antioxidant |  | 1.0 |

After compounding the latex samples were aged at room temperature for 24 hours after which films were cast on glass plates and dried 24 hrs. at room temperature. Films from each compound were cured in an air oven at 200° F. and their physical properties (stress at 500% designated as "S"; tensile strength in lbs./sq. in. designated as "T" and per cent ultimate elongation designated as "E") were measured before and after accelerated aging in an air bomb at 80 lbs. pressure for 3 hours at 260° F. with the following tabulated results:

| Hot Air Cures at 200° F. | Compound A | | | Compound B | | |
|---|---|---|---|---|---|---|
| | S | T | E | S | T | E |
| ORIGINAL PROPERTIES | | | | | | |
| 15 min | 240 | 4,200 | 940 | 200 | 5,100 | 975 |
| 30 min | 270 | 3,900 | 930 | 300 | 5,120 | 1,000 |
| AFTER AGING | | | | | | |
| 15 min | 80 | 1,260 | 1,080 | 180 | 2,900 | 1,050 |
| 30 min | 100 | 920 | 1,130 | 200 | 3,450 | 1,040 |

It is apparent from these results that the liquid mixture of this invention is a distinctly superior liquid antioxidant.

*Example IV*

Vulcanizable rubbery compositions were prepared from two GR–S type synthetic rubbers (copolymers of about 75 parts butadiene-1,3 with about 25 parts styrene) differing from one another only in that the synthetic rubber used in one case was prepared by addition of 1.5% of a liquid mixture of mono- and di-heptylated diphenyl amines as antioxidant to the synthetic rubber while in the latex stage in the process of its manufacture whereas the synthetic rubber used in the other case was similarly prepared using the product of Example II hereof as the liquid antioxidant. The two compositions contained the following ingredients, where the parts are by weight:

*Composition C*

| | Parts |
|---|---|
| Copolymer of butadiene-1,3 and styrene | 98.5 |
| Zinc oxide | 5.0 |
| Sulfur | 2.0 |
| Carbon black | 45.0 |
| Petroleum paraffin softener | 10.0 |
| N-cyclohexyl-2-benzothiazyl sulfenamide | 1.2 |
| Mixture of mono- and di-heptyl-diphenyl amine as antioxidant | 1.5 |

*Composition D*

| | Parts |
|---|---|
| Copolymer of butadiene-1,3 and styrene | 98.5 |
| Zinc oxide | 5.0 |
| Sulfur | 2.0 |
| Carbon black | 45.0 |
| Petroleum paraffin softener | 10.0 |
| N-cyclohexyl-2-benzothiazyl sulfenamide | 1.2 |
| Product of Example II as antioxidant | 1.5 |

These two compositions had the following physical properties after being vulcanized at 290° F. for 30 minutes:

| Composition | Modulus at 300% Elongation | Tensile Strength at Break, lbs./sq. in. | Elongation, Percent |
|---|---|---|---|
| C | 1,000 | 3,525 | 650 |
| D | 850 | 3,200 | 675 |

Test strips of vulcanized Compositions C and D after aging in the Bierer oxygen bomb under 300 lbs. pressure for 48 hrs. at 70° C., had the following physical properties:

| Composition | Tensile Strength at Break, lbs./sq. in. | Percent Loss | Elongation, Percent | Percent Loss |
|---|---|---|---|---|
| C | 2,175 | 38 | 300 | 54 |
| D | 2,550 | 20 | 370 | 45 |

Other test strips of vulcanized Compositions C and D were tested in the De Mattia Flexing Test (Test Method D–865–477 described in A. S. T. M. Bulletin No. 147, Aug. 1947) with the following results:

| | Flexures to reach rating of 8 |
|---|---|
| Composition C | 75,000 |
| Composition D | 100,000 |

These tests clearly show the superiority of the liquid composite product of this invention over the mixtures of mono- and dialkyl substituted diphenyl amine products when employed with synthetic rubbery vulcanizable materials.

While the above Examples III and IV are confined to the use of the liquid composite product of this invention as antioxidant for natural rubber and butadiene styrene copolymers, it may be used with equal success with any other rubbery materials which tend to deteriorate in presence of oxygen or air including, for example, rubber copolymers of butadiene-1,3 or other conjugated dienes with one or more copolymerizable compounds such as acrylic and methacrylic acids and their esters, nitriles and amides, vinyl pyridine, isobutylene, substituted styrenes etc. For example when the product of Example II is incorporated in a rubbery copolymer of butadiene-1,3 with acrylonitrile excellent antioxidant properties are imparted. The liquid antioxidant of this invention may also be used with polychloroprene and copolymers of chloroprene with other materials and with various other oxidizable organic materials. When used with any of the various polymeric organic rubbery materials it is effective in proportions ranging from about 0.1 to 5.0% or more of the rubbery material and its effect is not destroyed by the presence of the other usual compounding ingredients.

Although the invention has been disclosed by means of specific examples, I do not intend to limit myself solely thereto, but only to the extent indicated in the appended claims.

I claim:

1. A liquid oily composite product useful as an antioxidant and being essentially composed of a mixture of (1) p,p'-di-tertiaryoctyl diphenyl amine, (2) p,p'-di-alphaphenethyl diphenyl amine, (3) p-tertiaryoctyl-p'-alphaphenethyl diphenyl amine, (4) p-mono-tertiaryoctyl diphenyl amine and (5) p-mono-alphaphenethyl diphenyl amine in the ratio of 50 to 70% by weight of compounds (1), (2) and (3) to 30 to 50% by weight of compounds (4) and (5), said product resulting from the reaction of 1.3 to 2.0 moles of a hydrocarbon mixture containing diisobutylene and styrene in the ratio of 2 to 5 parts by weight of diisobutylene to 1 part by weight of styrene, with 1 mole of diphenyl amine.

2. The method of preparing a liquid oily product useful as an antioxidant which comprises reacting 1.3 to 2.0 moles of a hydrocarbon mixture containing diisobutylene and styrene in a ratio of 2 to 5 parts by weight of diisobutylene to 1 part by weight of styrene with 1.0 mole of diphenyl amine, in the presence of aluminum chloride catalyst and at a temperature of 150 to 200° C., removing the catalyst and unreacted materials, and recovering the resulting liquid oily reaction product.

ARTHUR L. HOLLIS.

No references cited.